INVENTORS
WAYNE G. SHEAR
SAMUEL ROGER EVERETT
BY William G. Christoforo
ATTORNEY

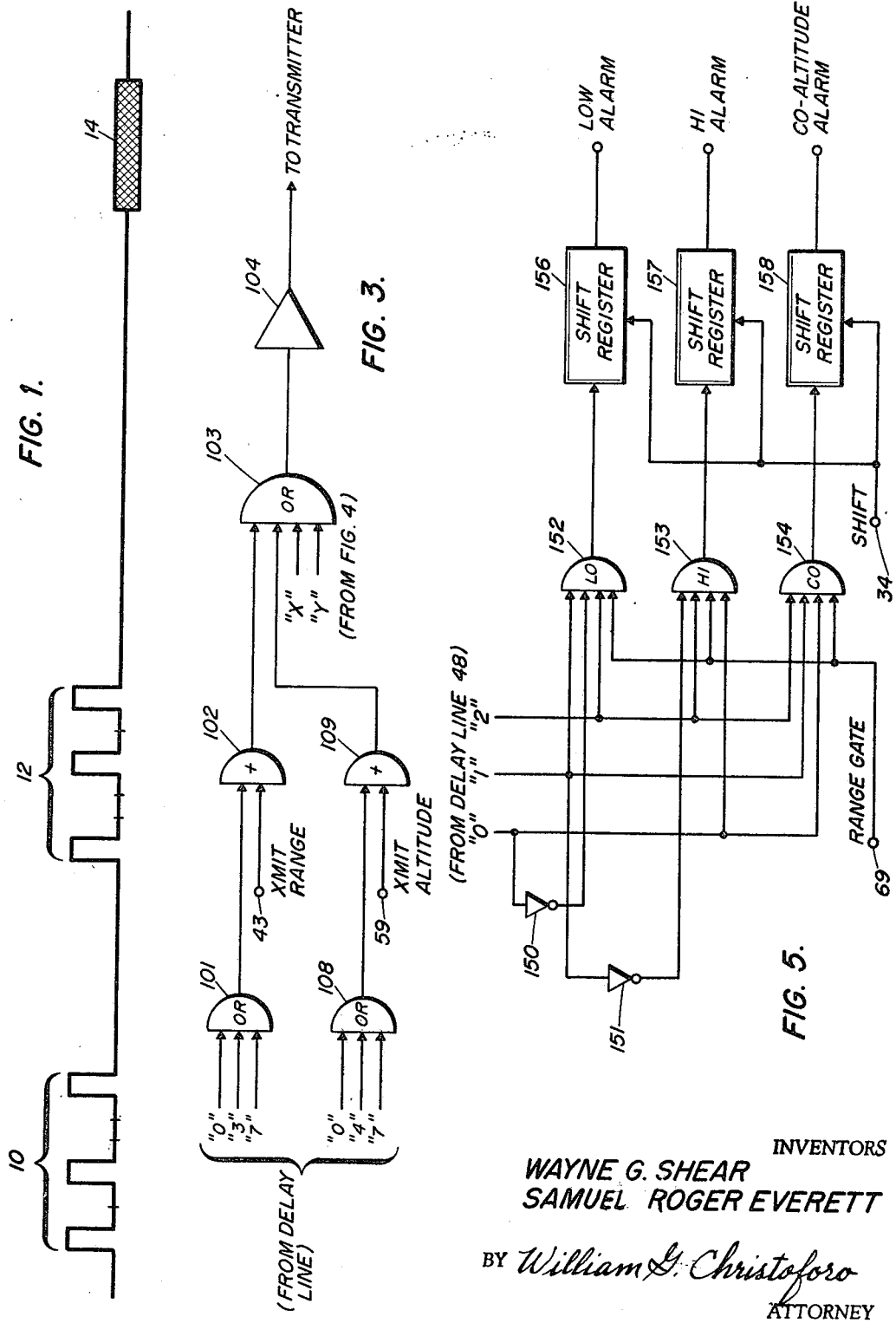

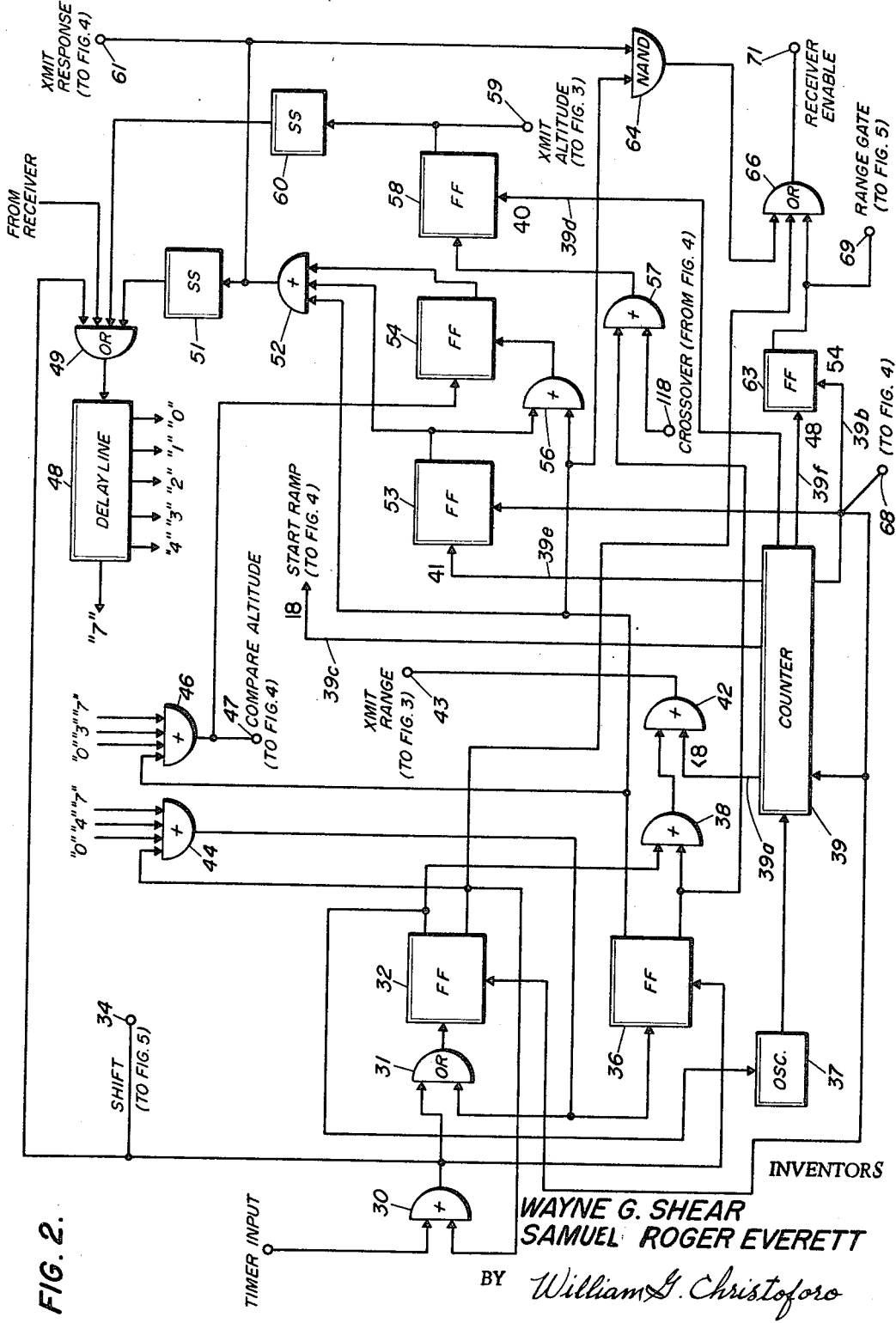

United States Patent Office 3,493,968
Patented Feb. 3, 1970

3,493,968
HELICOPTER PROXIMITY WARNING INDICATOR
Wayne G. Shear, Pompano Beach, and Samuel Roger Everett, Fort Lauderdale, Fla., assignors to The Bendix Corporation, a corporation of Delaware
Filed June 26, 1968, Ser. No. 740,357
Int. Cl. G01s 9/56
U.S. Cl. 343—6.5         8 Claims

ABSTRACT OF THE DISCLOSURE

A cooperative proximity warning indicator for helicopters wherein a protected helicoper equipped with a transponder transmits an interrogation message containing information as to the protected helicopter's altitude. An intruder helicopter similarly equipped with a transponder which receives the interrogation and is within a critical band of altitude about the protected helicopter's altitude, responds to the interrogation with a message containing information as to its altitude with respect to the protected helicopter's altitude. A reply gate generated by the protected helicopter's transponder allows responses only from intruder helicopters within a predetermined range of the protected helicopter to be received by the protected helicopter's transponder. Transponder decoding equipment decodes the intruder's altitude information from the response and displays it for the use of the pilot. Logic is also provided which requires multiple successive response receptions at the protected helicopter's transponder before the intruder's altitude is decoded and displayed.

BACKGROUND OF THE INVENTION

This invention relates to proximity warning indicator (PWI) systems for helicopters and more particularly to such systems which employ interrogation techniques in which an interrogator range gate permits responses only from intruders within a predetermined range to be received by the interrogator.

Aircraft collison avoidance systems in which interrogation/response transponders are used as proximity warning indicator (PWI) devices suffer from the primary shortcoming that communications density in a communications system increases approximately as the square of the number of participants. For PWI systems using transponder techniques in which the participants are high speed aircraft, the transponder range required to allow a transponder to determine that a collision situation exists is so large that the possible participant density within the airspace defined by that range makes a collision avoidance system of this type impractical. However, where the collision avoidance system participants are low speed aircraft and, in particular, helicopters, the range at which a potential collision situation must be made known to the pilot is small so that the participant density problem is not significant.

SUMMARY OF THE INVENTION

A proximity warning indicator has been devised which makes use of transponder techniques and wherein a digital counter and logic in an interrogating transponder cause a transponder which includes a delay line and suitable gates to transmit a message comprised of a pulse range grouping followed by a time positioned pulse altitude grouping as an interrogation. An altitude comparison is made by any intruder transponder receiving the message, with a response being transmitted by the intruder if it determines itself to be co-altitude with the interrogator within 300 feet. This response is transmitted, after a short fixed delay, as a single high or low altitude pulse code derived from available taps on an intruder transponder delay line.

After the same fixed delay, which accommodates full altitude time position plus compensation for multipath transmission, the interrogator opens a range gate corresponding to a 2000 foot transit time to receive any responses from within a 2000 foot range and ±300 foot altitude zone. Responses from intruders outside the 2000 foot range zone arrive at the interrogator after the range gate closes and are thus ineffectual.

Where the aircraft density is high and spread out over an area in excess of the 2000 foot range of interest, it is possible that an interrogator might receive a response from an intruder outside the 2000 foot range of interest which was interrogated by another interrogator which is also outside the 2000 foot range of interest. To eliminate this type of interference, interrogations from any interrogator are jittered by an amount greater than range gate width and at least two successive responses must be received during two successive range gates before the pilot is presented with information of a collision threat.

It is thus an object of this invention to provide a cooperative collision avoidance system using transponder techniques to effect a proximity warning indication.

It is another object of this invention to provide a cooperative collision avoidance system using transponder techniques wherein an interrogator transmits only information as to its altitude and an intruder responds only if it is co-altitude with the interrogator within a set altitude band.

It is still another object of this invention to provide a cooperative collision avoidance system using transponder techniques wherein the interrogator will react to responses only from intruders within a predetermined range of interest.

It is a further object of this invention to provide the cooperative collision avoidance system described wherein the effect of any responses received from intruders outside the range of interest are minimized.

BRIEF DESCRIPTION OF THE DRAWINGS

FIG. 1 is a line graph showing the basic format of an interrogation transmission.

FIG. 2 is a block diagram showing the basic counting and certain logic functions of the transponder.

FIG. 3 is a block diagram showing the transponder transmitter logic.

FIG. 5 is a block diagram showing the transponder alarm logic.

DESCRIPTION OF THE PREFERRED EMBODIMENT

Figure 4:
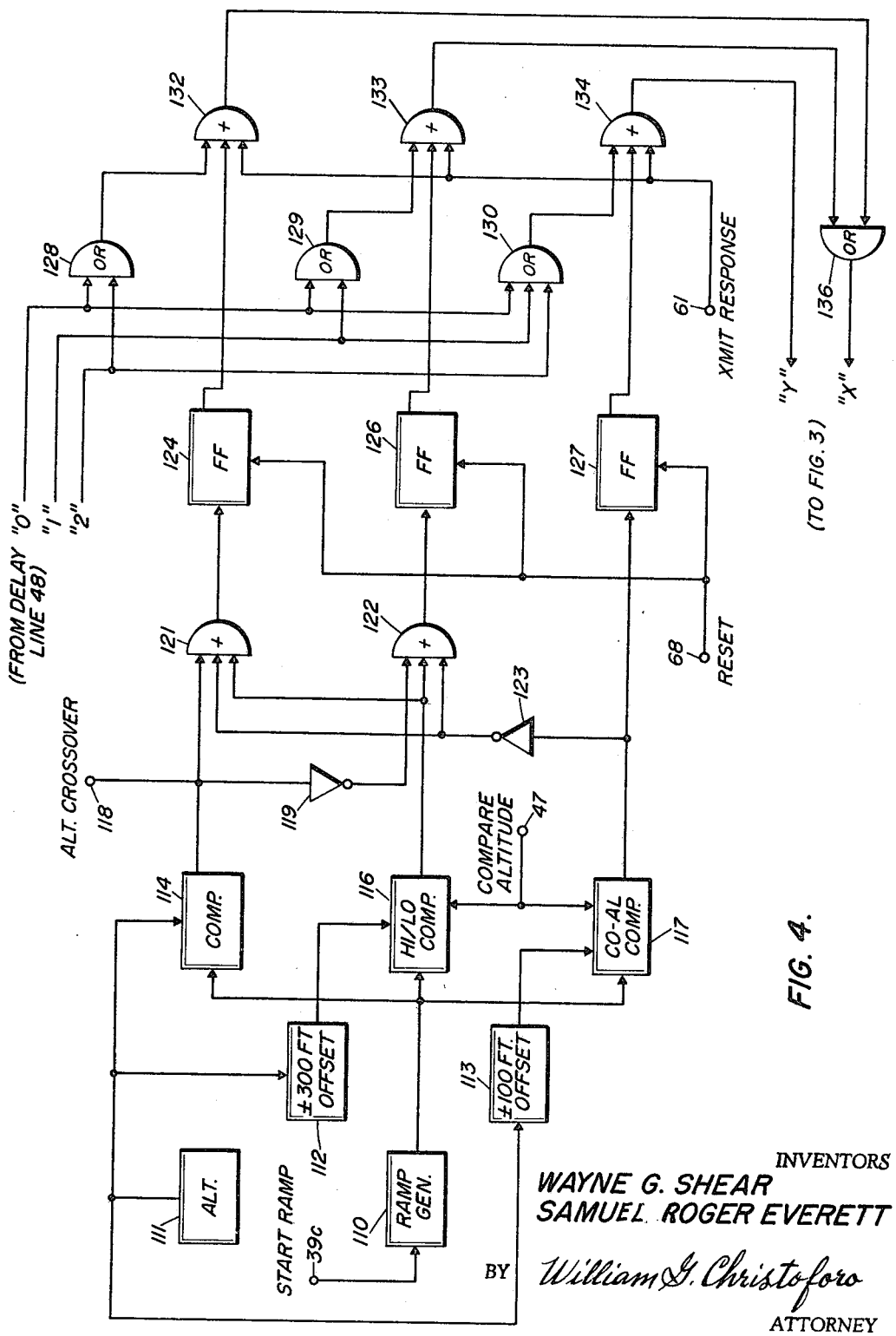
FIG. 4 is a block diagram showing the transponder altitude comparators.

Referring to FIG. 1, an interrogating aircraft transponder transmits, at a jittered one second rate, a range pulse triad 10, followed by an altitude pulse triad 12 whose position with respect to the range triad 10 is a linear function of interrogator altitude plus a fixed multipath guard interval. After transmission of both pulse groups, at time 69.6 microseconds after the start of the range pulse group, the interrogating aircraft opens a receive range gate 14 which allows any responses to the interrogation transmitted by aircraft within a 2000 foot range to be processed by the interrogator. After the range gate closes, the transponder returns to a reply mode for the remainder of the one second period.

In the reply mode, upon receipt of an interrogation an intruder compares received altitude with its own altitude and initiates a "high" or "low" reply if the two aircraft are within ±300 foot altitude respectively but not closer than ±100 foot altitude, or a "co-altitude" reply if the two aircraft are within ±100 foot altitude. It is this reply that will arrive within the interrogator's range gate 14 if the range is less than or equal to 2000 feet. Replies from a long range aircraft will not be processed.

Referring now to FIG. 2, a timer generates pulses at a jittered one second rate which are applied to "AND" gate 30, which, assuming flip-flop 32 is reset, is qualified so as to allow the pulse to pass therethrough to terminal 34 and through OR gate 31 to set flip-flop 32. The flip-flop 32 set signal energizes oscillator 37 which in response thereto applies a train of clock pulses having a pulse repetition rate of, for example, 1.45 microseconds to main counter 39, which is suitably an array of bistable elements and gates arranged to count the clock pulses and to generate output signals at various count accumulations. For example, a counter output signal appears on line 39a whenever the count is less than 8, on line 39c at count 18, on line 39d at count 40, on line 39e at count 41, on line 39f at count 48 and on line 39b at count 54.

The timer pulse appearing at the output of gate 30 is applied through gate 49 to delay line 48 which generates a series of pulses having a time relationship with the initial triggering pulse as follows: a pulse with no delay, a pulse with one pulsewidth delay, a pulse having a two pulsewidth delay, a pulse having a three pulsewidth delay, a pulse having a four pulsewidth delay, and a pulse having a seven pulsewidth delay as shown. The timer pulse also resets flip-flop 36, which thus qualifies "AND" gate 38 so as to allow the flip-flop 32 set output signal to pass therethrough and through gate 42, which is qualified whenever counter 39 count is below 8, so that a "transmit range" signal appears on terminal 43 for the first 7 counts of counter 39.

Referring now to FIG. 3, the "transmit range" signal on terminal 43 qualifies gate 102 so that the undelayed, third and seventh pulses generated by delay line 48 of FIG. 2 can pass through gates 101, 102 and 103. These pulses comprise the unique range pulse triad 10 shown in FIG. 1, and are amplified and normalized in amplifier 104 and then sent to a transmitter where they are modulated and transmitted into space. At the eighth count of counter 39 gate 42 closes and the range triad transmission ends.

At the eighteenth count from counter 39 a "start ramp" pulse appearing on line 39c triggers (referring to FIG. 4) ramp generator 110 which in response thereto generates a voltage output which increases linearly with time, this voltage thus comprising a computed altitude voltage as will be apparent from the following discussion. This voltage is compared in comparator 114 with a voltage proportional to the transponder altitude as generated by altimeter 111. When the computed altitude voltage is equal to the voltage proportional to actual altitude, comparator 114 generates an "altitude crossover" signal which appears on terminal 118. Referring again to FIG. 2, the "altitude crossover" signal on terminal 118 qualifies gate 57 so that the flip-flop 36 reset output signal can pass therethrough to set flip-flop 58. This flip-flop set output energizes terminal 59 and additionally triggers one-shot 60 which applies a pulse through gate 49 to the input of delay line 48.

Returning again to FIG. 3, it can be seen that gate 109 is now qualified so that the delay line 48 generated undelayed, fourth and seventh pulses can now proceed through gates 108, 109 and 103 to be transmitted as the altitude pulse triad previously described and in the same manner as the range pulse triad was transmitted. It should now be obvious that the spacing between the range triad and the altitude triad is a measure of the transponder's altitude.

At the fortieth count of counter 39, the counter generated signal on line 39d resets flip-flop 58 thus terminating altitude triad transmission.

An intruder receiving the range and altitude triads will compare the altitude indicated by the received signals with his own altitude and will transmit three consecutive pulses if he finds the altitudes coincide within ±100 feet or two consecutive pulses if he finds his altitude is more than 100 but less than 300 feet below the received altitude, or a two pulse grouping with a one pulse length spacing between pulses if he finds his altitude is more than 100 feet but less than 300 feet above the received altitude. The manner in which the intruder compares altitudes and generates the pulse codes will be described below, it being sufficient for the present to mention merely that these pulse codes are transmitted by the intruder at such a time with respect to the received range triad that the codes will be received by the interrogator during a predetermined range gate peiod defined by the 48th to 53rd count of counter 39 only if the range between the interrogator and intruder is less than 2000 feet.

To show how the interrogator opens a range gate during the above defined period and how he processes a response to his range and altitude triads it is necessary to once again refer to FIG. 2. At counter 39 count of 48 line 39f is energized thus setting flip-flop 63. The flip-flop set output passes through gate 66 to terminal 71 where it enables the transponder receiver during this range gate period. During this interval, any received pulses are applied through gate 49 to delay line 48. These video signals are sorted as to high, low or co-altitude threat by examining the appropriate delay line taps simultaneously in the manner illustrated by the circuitry shown in FIG. 5, reference to which should now be made. Since terminal 69 is energized while flip-flop 63 is in the set state gates 152 to 154 are partially qualified during the range gate period. It can now be seen that if three consecutive pulses are received during this period gate 154 will open to pulse shift register 158 once while inverters 150 and 151 will prevent gates 152 and 153 from opening. If two consecutive pulses are received gate 152 will open and shift register 156 will be pulsed. If the two pulse pair separated by one pulse interval is received gate 153 is opened and shift register 157 will be pulsed. A subsequent timer pulse will eventually appear on terminal 34, which is seen here and in FIG. 2, to shift the shift register. The shift registers are suitably two stage registers so that two consecutive identical responses are required to sound an alarm. This fact, together with the fact that the interrogations are jittered, decreases the probability of receiving false alarms especially from intruders at greater than the 2000 foot effective design range.

At counter 39 pulse 54, a counter output pulse on line 39b resets flip-flop 63 thus disabling the receiver and closing the range gate. Counter 39 and flip-flop 32 are also reset, the later action disabling oscillator 37 and re-enabling the transponder receiver through gate 66, thus returning the transponder to a stand-by, receive mode.

It is now necessary to show how an intruder which receives the range and altitude triads formulates and transmits a response. Referring still to FIG. 2 and assuming the transponder is in the stand-by, receive mode, video signals arriving at the transponder receiver are demodulated and applied through gate 49 to delay line 48. Proper delay line taps are connected to the input of gate 44 so that the receipt of the range pulse triad a single pulse passes through gate 44 to set flip-flops 32 and 36, thereby once again causing oscillator 37 clock pulses to be accumulated in counter 39. It should be remembered that counter 39 starts only after the entire range triad has been received. Since flip-flop 36 is in the set state, the receiver is now enabled through NAND gate 64 and gate 46 is partially qualified so that upon receipt and decoding of the altitude pulse by delay line 48, a pulse will pass through gate 46 to set flip-flop 54. Additionally, this pulse, which appears only after the complete altitude triad has been received, momentarily energizes terminal 47. Additionally, at counter 39 count of 18 line 39c is energized thus starting ramp generator 110 in FIG. 4.

Refer now to FIG. 4. The ramp generator output voltage which, as has been explained, is proportional to a computed altitude is applied to comparators 114, 116 and 117. A voltage proportional to transponder altitude is generated, as before, by altimeter 111 and applied directly to comparator 114. The transponder altitude voltage, however, in offset generator 112 is offset by a voltage equal to a ±300 foot altitude difference before it is applied to comparator 116 and offset in offset generator 113 by a voltage equal to a ±100 foot altitude difference before it is applied to comparator 117. The offset generators suitably comprise a voltage dividing network with voltage both above and below altitude voltage being chosen for comparison. Comparator 114 generates an output whenever altitude voltage is below ramp voltage, that is, whenever transponder altitude as determined by altimeter 111 is below computed altitude. When terminal 47 is energized, which is upon full receipt of the altitude triad as previously explained, comparators 116 and 117 compare the voltages applied thereto with comparator 117 generating an output whenever the equivalent altitudes are within 100 feet of one another and comparator 116 generating an output whenever the equivalent altitudes are within 300 feet of one another.

That these voltages truly represent the altitudes of the intruder and interrogator can be seen from the following. Since counter 39 counts 18 pulses from the leading edge of the first pulse in the range triad to the starting of the ramp generator when the transponder is interrogating, and 18 counts from the leading edge of the last pulse in the range triad to the starting of the ramp generator when the transponder is responding, it can be seen that the basic altitude relationship pulse position encoded into the altitude triad is retained whether the transponder is in the interrogating or responding mode. Assume now that the interrogator and intruder are within 100 foot altitude. Both comparator 116 and 117 generate outputs. Comparator 117 output acting through inverter 123 disables gates 121 and 122 while setting flip-flop 127. In another example, if the compared altitudes are within 300 feet but without 100 feet, comparator 116 generates an output. If the intruder's altitude is above the interrogator's altitude, comparator 114 will also generate an output thus opening gate 121 so as to set flip-flop 124 while disabling gate 122. For the case where intruder's altitude is below interrogator's altitude flip-flop 126 is set.

Returning again to FIG. 2, at count 41, the signal on line 39e sets flip-flop 53 thus resetting flip-flop 54 through qualified gate 56. Gate 52 now opens and one-shot 51 is triggered to generate a pulse which is applied through gate 49 to delay line 48. Additionally terminal 61 is energized and gate 64 closes, again disabling the receiver.

Returning once again to FIG. 4, with terminal 61 now energized gates 132 to 134 are partially qualified depending upon which flip-flop 124, 126 or 127 is set. When the delay line generated pulses are applied through OR gates 128 to 130 to gates 132 to 134 the proper gate will be opened to allow the correct altitude code to pass via line "X" or "Y" through gate 103 of FIG. 3 to be transmitted back to the interrogator.

As before, at count 54 flip-flops 124, 126 and 127 are reset along with the remainder of the transponder into the receive, stand-by mode to await either the receipt of a range triad or a timer pulse as already described.

It will be remembered that the interrogator starts counting at the beginning of the range triad, whereas the intruder starts counting only after a received range triad is decoded. Thus, to insure that a response is received by an interrogator at zero range within his range gate (counts 48 to 53) the intruder must initiate his response at his 41st count, as is the case. Additionally, since the response transit time for a 2000 foot range is about 3 counts of 1.45 milliseconds each, and the last transmitted of the response pulses is a pulse delayed by two pulse-widths, the range gate must stay open for six counts to insure that only responses from intruders within the 2000 foot range are received, as is also the case.

Having described the preferred embodiment of our invention we now claim the subject matter thereof and including modifications and alterations thereof encompassed by the true scope and spirit of the appended claims.

The invention claimed is:

1. An aircraft proximity warning transponder system for transmitting interrogations including a first unique range pulse grouping and a second unique altitude pulse grouping modulated to contain information as to said transponder's altitude and wherein an intruder, having a transponder essentially identical to said proximity warning transponder, which receives said interrogations, demodulates said interrogations so as to extract said altitude information therefrom, compares said altitude information with intruder's altitude and responds a predetermined time after receiving said first unique pulse grouping with a third unique pulse grouping containing comparison information, said system comprising:

a source of jittered electrical timing pulses;

pulse delay means having multiple output taps and having an input tap connected to receive pulse inputs from various pulse sources, one of said sources being said timing pulse source;

oscillator means for generating a train of clock pulses;

means responsive to each said timing pulse for generating a first state signal, said first state signal enabling said oscillator means;

counting means responsive to said clock pulses for generating counter signals during predetermined time periods with respect to the enabling of said oscillator;

means responsive to said first state signal and a first of said counter signals for generating a "transmit range" signal;

first gating means qualified by said "transmit range" signal and connected to various of said pulse delay means output taps for generating said first unique range pulse grouping;

altimeter means for generating a first electrical signal proportional to transponder altitude;

timing means initiated by a second of said counter signals for generating a second electrical signal which increases with time, said second electrical signal being proportional to a computed altitude;

comparator means for comparing said first and second electrical signals to generate a first error signal when transponder altitude is equal to computed altitude;

means responsive to said first error signal for generating a "transmit altitude" signal;

a second pulse source connected to apply pulses generated thereby to said pulse delay means input tap for generating a pulse when triggered by said "transmit altitude" signal;

second gating means qualified by said "transmit altitude" signal and connected to various of said pulse delay means taps for generating said second unique altitude pulse grouping;

radio frequency transmitter means for modulating and transmitting said first and second unique pulse groupings into space via a radio link;

receiver means disabled by said oscillator enabling signal for receiving and demodulating responses from said intruder transponders, said receiver means comprising a third pulse source connected to said pulse delay means input tap;

means responsive to a third of said counter signals for generating a range gate signal, said receiver means being enabled by said range gate signal so as to be enabled during a predetermined time period with respect to each of said timing pulses; and, means connected to various of said pulse delay means output taps and qualified by said range gate signal for decoding intruder responses received by said receiver means.

2. An aircraft proximity warning transponder system as recited in claim 1 wherein said counting means comprises a plurality of bistable elements arranged to count pulses applied thereto; and, a third gating means responsive to the state of said bistable elements for generating said counter signals.

3. An aircraft proximity warning transponder system as recited in claim 1 wherein the pulse repetition rate of said timing pulses is long compared to the time from one of said timing pulses to said third counter signal and the time duration of said third signal is correlative to a predetermined range from said transponder whereby intruder responses from intruders within said range arrive at said transponder during said time duration of said third counter signal.

4. An aircraft proximity warning transponder system as recited in claim 3 wherein said third unique pulse grouping is transmitted by said intruder and received by said transponder in serial by bit format, said pulse delay means being arranged to transform said serial by bit format to a unique parallel format correlative to said third unique pulse grouping and said decoding means comprising:
 fourth gating means connected to predetermined output taps of said pulse delay means and qualified by said range gate signal for generating an alarm pulse upon receipt by said transponder of said third unique pulse grouping during the time duration of said third counter signal; and,
 shift register means responsive to said timing pulses for generating an alarm signal after a predetermined number of consecutive intruder responses are decoded.

5. An aircraft proximity warning transponder system as recited in claim 3 wherein said means for generating a first state signal comprises a tristable element having three stable states, said first state being generated when said element is in a first stable state, a second state signal being generated when said element is in a second stable state, and a third state signal being generated when said element is in a third stable state and wherein said element is responsive to a fourth counter signal for generating said second state signal and wherein said counting means is reset and said range gate signal extinguished by said fourth counter signal, said received means being enabled by said second state signal and wherein said transponder system additionally includes:
 fifth gating means qualified by said second state signal and having input taps connected to predetermined pulse delay means output taps for triggering said tristable element to said third state wherever a received first unique pulse grouping is decoding by said pulse delay means, said oscillator means being enabled by said third state signal;
 sixth gating means qualified by said third state signal and having input terminals connected to predetermined pulse delay means output taps for generating a "compare altitude" pulse when a received second unique pulse grouping is decoded by said pulse delay means;
 means responsive to said "compare altitude" pulse for offsetting said first electrical signal by an amount proportional to a predetermined altitude band whereby said comparator means generates a second error signal if said second electrical signal falls with the predetermined altitude band as defined by said offset first electrical signal;
 means responsive to said third state signal and a fourth counter signal for generating a "transmit response" signal;
 means responsive to said "transmit response" signal for disabling said receiver means;
 a fourth pulse source for applying a pulse to said pulse delay means when triggered by said "transmit response" signal; and,
 seventh gating means qualified by said second error signal and said "transmit response" signal and having input terminals connected to predetermined pulse delay means output taps for generating said third unique pulse grouping, said third pulse grouping being modulated and transmitted into space by said transmitter means.

6. An aircraft proximity warning transponder system as recited in claim 5 wherein said first electrical signal comprises a voltage having a magnitude proportional to transponder altitude and said timing means comprises a ramp voltage generator triggered by said second counter signal for generating a voltage whose magnitude increases with time and is proportional to said computed altitude and wherein said means for offsetting said first electrical signal comprises:
 means biasing said first altitude signal for generating a double biased electrical signal, a first biased electrical signal being of lower voltage than said first electrical signal, and a second biased electrical signal being of higher voltage than said first electrical signal, and wherein said comparator means comprises;
 a first comparator for generating said first error signal when said second electrical signal exceeds said first electrical signal; and,
 a second comparator responsive to said "compare altitude" pulse for generating said second error signal when said second electrical signal exceeds said first biased signal but is less than said second biased signal.

7. A helicopter proximity warning transponder comprising:
 a source of jittered timing pulses;
 means for counting clock pulses and generating counter signals during predetermined counts;
 a tristable element for generating first, second and third state signals when in a first, second or third state respectively, each said timing pulse triggering said element into said first state;
 a delay line having multiple output taps and an input for encoding single pulses applied to said input into time spaced pulses at said output taps and for decoding serial pulse groups applied to said input into parallel pulse groups at said output taps;
 a source of clock pulses for said counting means enabled by said first state signal and said third state signal;
 means for connecting said timing pulse source to said delay line input;
 first gating means qualified by said first state signal for passing a first counter signal generated by said counting means during a first predetermined counter period, said first counter signal thereby comprising a "transmit range" signal;
 means for generating a first electrical signal proportional to transponder altitude;
 means triggered by a second counter signal comprising a pulse generated by said counter at a second predetermined count for generating a time increasing second electrical signal proportional to computed altitude;
 first means for comparing said first and second electrical signals and for generating an altitude crossover pulse when said transponder altitude equals said computed altitude;
 means responsive to said altitude crossover pulse and said first state signal for generating a transmit altitude signal;
 second gating means having an output line and inputs connected to first and second predetermined groups of said delay line output taps and qualified by said transmit range and transmit altitude signals for arranging said time spaced pulses on said first and second predetermined groups of delay line output taps in serial pulse grouping on said second gating means output line;
 radio frequency means for modulating and transmitting into space pulses appearing on said second gating means output line;

means for delivering a single pulse to said delay line input when triggered by said transmit altitude signal;

radio frequency receiving means for receiving and demodulating intruder responses when enabled and for applying received and demodulated pulses to said delay line input, said receiver means being normally enabled by said second and third state signals;

means triggered by a third counter signal for generating a range gate signal and triggered by a fourth counter signal for extinguishing said range gate signal, said range gate signal additionally enabling said receiver means, and said counter being reset and said tristable element being triggered into said second state by said fourth counter signal;

third gating means qualified by said second state signal and having input taps connected to a third predetermined group of delay line output taps for generating an output pulse wherever a first unique serial pulse grouping is applied to said delay line input tap, said output pulse triggering said tristable element to said third state;

fourth gating means qualified by said third state signal and having input taps connected to a fourth predetermined group of delay line output taps for generating a compare altitude pulse whenever a second unique serial pulse grouping is applied to said delay line input tap;

means responsive to a fifth counter signal and said third state signal for generating a transmit response signal;

means for applying a single pulse to said delay line input when triggered by said transmit response signal;

means responsive to said transmit response signal for disabling said receiver means;

first means for biasing said first electrical signal;

second means responsive to said compare altitude pulse for comparing said first biased first electrical signal with said second electrical signal and for generating a first error signal when said first biased first electrical signal equals said second electrical signal;

fifth gating means having an output line and qualified by said transmit response signal and responsive to said first error signal and having inputs connected to a fifth predetermined group of delay line output taps for arranging said time spaced pulses on said fifth predetermined group of delay line output taps into a first response serial pulse grouping on said fifth gating means output line;

unilateral means connecting said fifth gating means output line to said second gating means output line;

sixth gating means qualified by said range gate signal and having input taps connected to said fifth predetermined group of delay line output taps for generating an output pulse when predetermined ones of said fifth group of delay line taps are simultaneously energized; and, shift register means shifted by said timing pulses and triggered by said sixth gating means output pulses for generating an alarm.

8. A transponder as recited in claim 7 with additionally:

second means for biasing said first electrical signal;

third means responsive to said compare altitude pulse for comparing said second biased first electrical signal with said second electrical signal and for generating a second error signal when said second biased first electrical signal equals said second electrical signal;

seventh gating means inhibited by said first error signal and responsive to said altitude crossover signal and said second error signal for generating first and second output pulses, said fifth gating means being additionally responsive to said first and second output pulses for arranging said time spaced pulses on said fifth predetermined group of delay line output taps into second and third response serial pulse groupings respectively on said fifth gating means output line.

References Cited

UNITED STATES PATENTS

| 3,035,260 | 5/1962 | Freedman et al. | 343—6.5 |
| 3,114,145 | 12/1963 | Vielle et al. | 343—6.5 |
| 3,341,846 | 9/1967 | McMurren et al. | 343—6.8 |
| 3,360,795 | 12/1967 | Lundgreen et al. | 343—6.5 X |

RODNEY D. BENNETT, JR., Primary Examiner

MALCOLM F. HUBLER, Assistant Examiner

U.S. Cl. X.R.

343—6.8

UNITED STATES PATENT OFFICE
CERTIFICATE OF CORRECTION

Patent No. 3,493,968　　　　　　　　　Dated 2-3-70

Inventor(s) Wayne G. Shear et al

It is certified that error appears in the above-identified patent and that said Letters Patent are hereby corrected as shown below:

Column 5, line 71 "milliseconds" should read -- microseconds --

Signed and sealed this 2nd day of May 1972.

(SEAL)
Attest:

EDWARD M. FLETCHER, JR.　　　　　　ROBERT GOTTSCHALK
Attesting Officer　　　　　　　　　　Commissioner of Patents